(12) United States Patent
Heimendinger et al.

(10) Patent No.: US 6,278,532 B1
(45) Date of Patent: *Aug. 21, 2001

(54) APPARATUS AND METHOD FOR RECEPTION AND TRANSMISSION OF INFORMATION USING DIFFERENT PROTOCOLS

(75) Inventors: Larry M. Heimendinger, Studio City; Richard J. McConnell, Sherman Oaks, both of CA (US)

(73) Assignee: Link2IT, Van Nuys, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/770,775

(22) Filed: Dec. 20, 1996

(51) Int. Cl.$^7$ .................................................. H04N 1/00
(52) U.S. Cl. ........................................ 358/442; 379/100.08
(58) Field of Search .................................. 379/89, 90.01, 379/90.02, 93.23, 93.24, 93.25, 100.01, 100.06, 100.08; 358/400, 402, 442

(56) References Cited

U.S. PATENT DOCUMENTS

| | | | |
|---|---|---|---|
| 4,922,348 | 5/1990 | Gillon et al. | 358/407 |
| 4,994,926 | 2/1991 | Gordon et al. | 358/400 |
| 5,091,790 | 2/1992 | Silverberg | 358/434 |
| 5,115,326 | 5/1992 | Burgess et al. | 358/440 |
| 5,127,048 | 6/1992 | Press et al. | 379/100 |
| 5,287,199 | 2/1994 | Zoccolillo | 358/402 |
| 5,291,302 | 3/1994 | Gordon et al. | 358/400 |
| 5,305,401 * | 4/1994 | Feigenbaum | 395/775 |
| 5,339,174 | 8/1994 | Harris | 358/442 |
| 5,404,231 | 4/1995 | Bloomfield | 358/400 |
| 5,452,106 | 9/1995 | Perkins | 358/468 |
| 5,459,584 | 10/1995 | Gordon et al. | 358/434 |
| 5,461,488 | 10/1995 | Witek | 358/402 |
| 5,479,411 * | 12/1995 | Klein | 370/110.1 |
| 5,499,109 | 3/1996 | Mathur et al. | 358/400 |
| 5,555,100 | 9/1996 | Bloomfield et al. | 358/402 |
| 5,559,611 | 9/1996 | Bloomfield et al. | 358/407 |
| 5,696,600 | 12/1997 | Perkins | 358/442 |
| 5,758,159 * | 5/1998 | Collet | 395/683 |
| 5,850,449 * | 12/1998 | McManis | 380/25 |
| 5,983,259 * | 11/1999 | Campbell | 709/200 |
| 6,182,154 * | 1/2001 | Campagnoni | 709/315 |

FOREIGN PATENT DOCUMENTS

| | | | |
|---|---|---|---|
| 0504884A2 | 9/1992 | (EP) | H04N/1/00 |
| 0666670A2 | 8/1995 | (EP) | H04L/29/06 |
| WO95/22865 | 8/1995 | (WO) | H04N/1/32 |

OTHER PUBLICATIONS

C++ in Plain English; Brian Overland pp. v, 134–35; 350–55, 1996.*

* cited by examiner

Primary Examiner—Jerome Grant, II
(74) Attorney, Agent, or Firm—Finnegan, Henderson, Farabow, Garrett & Dunner, L.L.P.

(57) ABSTRACT

A Protocol Fax Box (PFB) receives information, determines destinations for the information, and converts the information protocol and data, if necessary, for transmission to the destinations. The PFB has plural interfaces from which it receives and sends data. Upon receiving information on one of its interfaces, the PFB creates a set of objects for handling the transfer of the information from the incoming interface to an outgoing, or destination, interface. A source object handles the incoming communication, a session object handles destination determination, and a destination object handles protocol conversion from the source interface to the destination interface. The session object also logs information regarding each session. The PFB may use a client server model to download information as needed from a network, or have processing be performed on the network.

28 Claims, 14 Drawing Sheets

APPARATUS AND METHOD FOR RECEPTION AND TRANSMISSION OF INFORMATION USING DIFFERENT PROTOCOLS

I. BACKGROUND OF THE INVENTION

A. Field of the Invention

The present invention relates generally to information transfer, and in particular to apparatus and methods for sending and receiving information to and from multiple types of devices and communications media.

B. Description of the Prior Art

Many types of information transfer occur in the modern commercial environment. For example electronic mail ("E-mail") and facsimile ("fax") are frequently used to transfer information between people. Many forms of computer networks exist to transfer information between computers. Examples include local area networks, wide area networks, local area networks, intranets and the Internet.

Fax transmission ranks only behind telephone voice calls as the most reliable and widely used form of communication throughout the world. Long distance charges for faxing in the U.S. alone is estimated at about $30 billion annually. International charges are proportionally much higher, especially for faxes originating outside the U.S. AT&T estimates that about 56% of its U.S.-Asian long distance traffic is for fax traffic. An estimated 60 billion pages of documents will be transmitted from U.S. fax machines in 1996, and that figure is expected to double before the end of the decade.

It is estimated that the number of fax machines in use ranges from 30 to 80 million machines world wide. A more conservative view is that there are about 4½ million machines currently operating in the Fortune 500 companies world wide, and probably an equal number in the rest of the corporate world. Even more astounding is the rate of growth in numbers of fax machines in major companies: about 25% per year for the past several years.

There are several advantages of using fax machines. People trust faxing because the process can be seen, heard, and verified, and because fax machines are intuitive to operate. In fact, corporations spend literally nothing for fax training. Everyone can use fax machines, they are located everywhere, and they are dependable for delivering information from one place to another.

Although the basic technology of faxing has remained the same for quite some time, the nature of fax transmission usage has changed dramatically. Faxes were often used in the past for merely conveying small notes and quickly delivered letters. Today, however, faxes are also used for higher volume purposes, such as delivery of commercial documents for ordering and delivering goods and services. Now, instead of sending a simple page of changes to a document, the entire document is retransmitted for only an incremental cost.

The fax machine, however, is frequently taken for granted, or even ignored, in corporate communications and computer networks. While computer-generated faxes have been used to advantage in specific applications and circumstances, communications via facsimile has not been as popular in the world of local area and wide area networks and information integration.

Similarly, E-mail is frequently used, but only in very specific circumstances. People are habit-prone to using one or the other for communicating with another person, and the recipient really has no choice in how information is received. This results in a need for people to monitor a variety of communication media each having different types of information forms of protocol and data. Moreover, the types of protocol and data may be multiplied if many communications media are used. Therefore, the use of each form of communication is constrained in many ways.

There are many forms of computer networks in use in commercial, academia, and government environments. For example, the Internet is now widely used virtually everywhere.

Internet connections are valuable for a number of reasons. First, use of the HyperText Transfer Protocol (HTTP) on the "World Wide Web," such as by Web servers and Web browsers, has revolutionized many areas of business. The Internet has brought a critical mass of information content, including communications, into the corporate environment. Products such as Java, ActiveX controls, and client/server applications are revolutionizing how business is conducted with customers and vendors.

Second, the Internet makes it possible to connect throughout the world for the cost of a local connection. "Everyone" is paying for their small connection piece, and the result is a vast network that no one individual could afford. Changes to operating systems now make accessing Internet resources as simple and easy as accessing a local device.

Additional features of computer networks provide enhanced functionality. For example, "Groupware" computing allows multiple users to share information in a cooperative fashion. Remote access computing allows users to dial in by standard telephone lines while away from the office and operate as though they were connected to the computer network in the office.

Despite the complementing advantages of faxing and computer communication, systems implementing these forms of communications have not been successfully melded into a single seamless system. There are several reasons for this. First, fax machines are not typically connected to corporate computer networks at all. Second, known methods of such connections have significant disadvantages. One method, for example, used a "fax/modem." However, fax machines and fax/modems connected to personal computers require a telephone line to communicate to the outside world. Telephone lines may or may not be part of a corporate computer communication system. Moreover, integration of faxing into the corporate information structure is practically non-existent.

For individual users, a fax/modem is useful in sending faxes of computer-generated documents. However, it is to difficult, time consuming, and expensive to convert paper documents to electronic form using scanners and disk storage. It is far easier to print the electronic document, combine them with the paper ones, and drop them into the nearest fax machine. Moreover, computer screens are an inferior way to display document pages, thus important documents received by a computer via fax/modem are typically printed and treated as paper documents.

Another method for integrating computer networks and fax communications uses a fax server, that is, a computer-equipped fax with multiple fax ports to send and receive faxes, and specialized software for routing an incoming fax and delivering it to the appropriate client connected fax machine. There are a number of applications where fax servers handle large volumes of fax traffic, thus justifying the high initial costs by spreading costs over a large number of users.

Fax servers also have a number of drawbacks, however. They are not cost effective for applications serving less than a high number of users, making them inappropriate for branch office locations or in specialized department locations. Moreover, fax servers are merely powerful versions of computers with fax/modems, so many of the drawbacks of PCs with fax/modems apply to fax servers as well.

Yet another attempt to enhance functionality of fax communication is exemplified in a server now offered in which a fax machine user dials a toll-free access number, enters a user code, and then starts the fax transmission over a proprietary communications network. Fax delivery is usually guaranteed within a defined time, and optional confirmation reports can be received after the fax has arrived, and telephone cost reduction can be achieved..

Many companies, however, do not wish to send faxes over networks they cannot reasonably control. Concerns about reliable delivery and security of information in faxes is an often repeated reason why corporations have not chosen these services in any noticeable measures. These services do not offer any added value by integrating faxes into corporate information systems.

The primary problem with each of multiple types of information and currently available computer networks is that both senders and receivers of information have very few choices in the form of communication of information. That is, senders of E-mail must send messages to an E-mail box. Receivers of E-mail must retrieve the E-mail from the E-mail box. Senders of faxes must send to a computer or a fax machine. Receivers of faxes must convert the fax in the computer or print the fax out on the fax machine. It is therefore desirable to provide methods and apparatus to facilitate integration of a fax machine into corporate communications networks while minimizing the problems of the prior art.

II. SUMMARY OF THE INVENTION

The present invention relates to reception and transmission of information. In a first aspect, the invention comprises apparatus including a plurality of interfaces; means for receiving incoming information having a first protocol and first data over one of the interfaces; means for analyzing the incoming information to determine a destination; means for processing the incoming information in accordance with the determined destination to create outgoing information having a protocol and data specifically for the destination; and means for transmitting the outgoing information to the destination. The present invention is also directed to methods for carrying out these functions.

Additional features and advantages of the invention will be set forth in part in the description which follows, and in part will be obvious from the description, or may be learned by practice of the invention. The objectives and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

III. BRIEF DESCRIPTION OF THE DRAWINGS

The accompanying drawings, which are incorporated in and constitute a part of this specification, illustrate embodiments of the invention and together with the description, serve to explain the principles of the invention.

IV. DETAILED DESCRIPTION OF THE PREFERRED EMBODIMENTS

Reference will now be made in detail to the present preferred embodiment of the invention, examples of which are illustrated in the accompanying drawings. Wherever possible, the same reference numbers will be used throughout the drawings to refer to the same or like parts.

Figure 1:
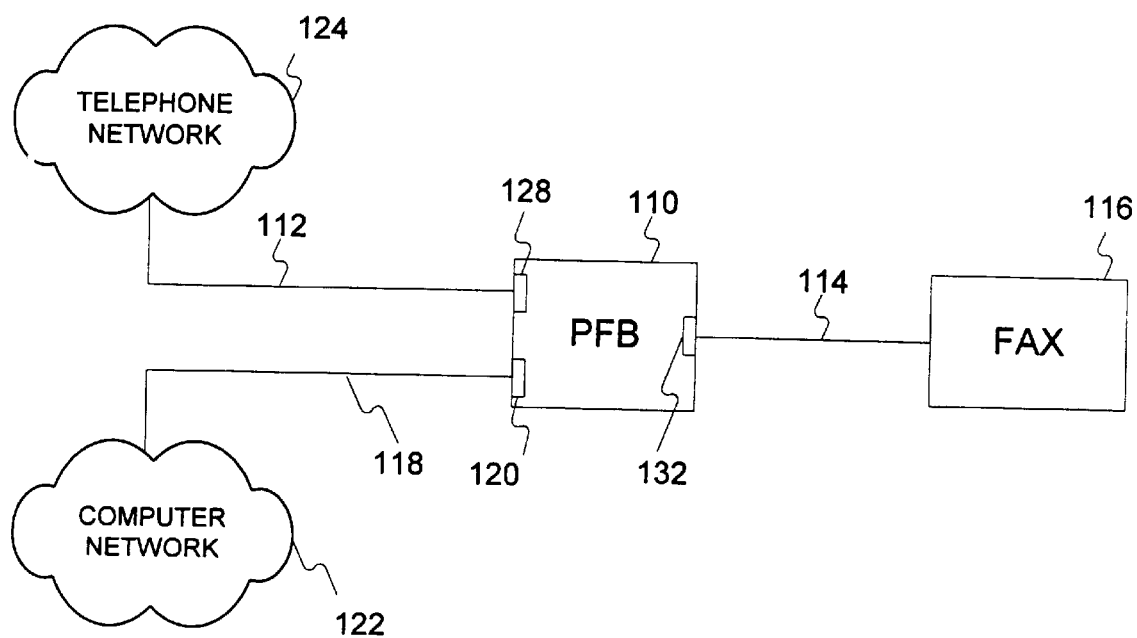
FIG. 1 shows a system overview of a Network Protocol Fax Box (PFB) which constitutes a preferred embodiment of the invention.

FIG. 1 shows a Network Protocol Fax Box (PFB) 110 which constitutes a preferred embodiment of the invention. PFB 110 is connected to a fax machine 116, such as a standard Group 3 machine, via an interface 132 and a communications line 114. PFB 110 receives fax information from fax machine 116 and sends fax information to fax machine 116 over communications line 114. In a preferred embodiment, communications line 114 is implemented as a standard two-conductor cable commonly used for telephone wiring. PFB 110 may also be connected to multiple fax machines using separate interfaces and communications lines, or over a local area network (not shown).

PFB 110 is also connected to a telephone network 124 by an interface 128 and a communications line 112. In a preferred embodiment, PFB 110 is connected to telephone network 124 through a telephone jack. Although FIG. 1 shows a single line connected to a single telephone network, PFB 110 may also be connected to several telephone networks. Telephone network 124 may be any type of network which carries telephone communications, such as a public switched, cellular, or PBX telephone network. If telephone network 124 is a cellular telephone network, communications line 112 and interface 128 are implemented as a wireless link from PFB 110 to telephone network 124.

PFB 110 is also connected to a computer network 122 via an interface 120 and a communications line 118. Although FIG. 1 shows a single line to a single network, PFB 110 may be connected several computer networks. The computer network 122 could be any computer network, such as the Internet or an intranet. Computer network 122, communications line 118, and interface 120 are implemented using standard protocols for transmitting information on computer networks.

PFB 110 coordinates reception of information from various types of sources over various types of communications lines, and transmission of the information to various types of destinations over various types of communications lines, using protocols which are required by the sources, destinations and communications lines. As used herein, "information" includes transmission signals which have a protocol and data. The term "protocol" is used herein in its broad sense as a set of procedures and data formats to implement communications between communication devices over a communications medium. For example, information processed by PFB 1 may have an Ethernet protocol, an Internet protocol, an E-mail protocol, or a fax protocol. Information may include more than one protocol if it must be transmitted over several media. Transmission of the information by PFB 110 may include the process of translating both the protocol and the data of the information, if necessary.

The data portion of the information is the content of the information which is being transmitted from a source to one or more destinations. Data may have various formats, such as ASCII text or facsimile. Therefore, PFB 110 translation of information protocol and data may, for example, involve translation of an Ethernet protocol to an Internet protocol, as well as translation from fax data to E-mail data.

PFB 110 allows fax machine 116 to send a fax to other fax machines, to destinations on computer network 122, and to destinations on telephone network 124. PFB 110 also allows faxes and E-mail to be sent from telephone network 124 and computer network 122 to fax machine 116, to other fax machines, or to another telephone network and computer network.

PFB 110 generally uses data and programs stored in PFB 110 to process incoming information. However, PFB 110 may also download data and programs from computer network 122 and telephone network 124. PFB 110 may also request that devices on computer network 122 and telephone network 124 store data and run programs. By operating PFB 110 this way, as a "thin client," storage and processing requirements of PFB 110 are reduced. This also reduces maintenance procedures such as updating software in PFB 110 because new programs and information can be automatically updated at the remote sites for use by, or downloading to, PFB 110. Therefore, with respect to the discussion which follows, it should be kept in mind that the programs and data for implementing the operations of PFB 110 may reside locally at PFB 110, or may be located on the telephone or computer networks. Programs and data can therefore be distributed among PFB 110, computer network 122 and telephone network 124, and the distribution may change dynamically.

Figure 2:
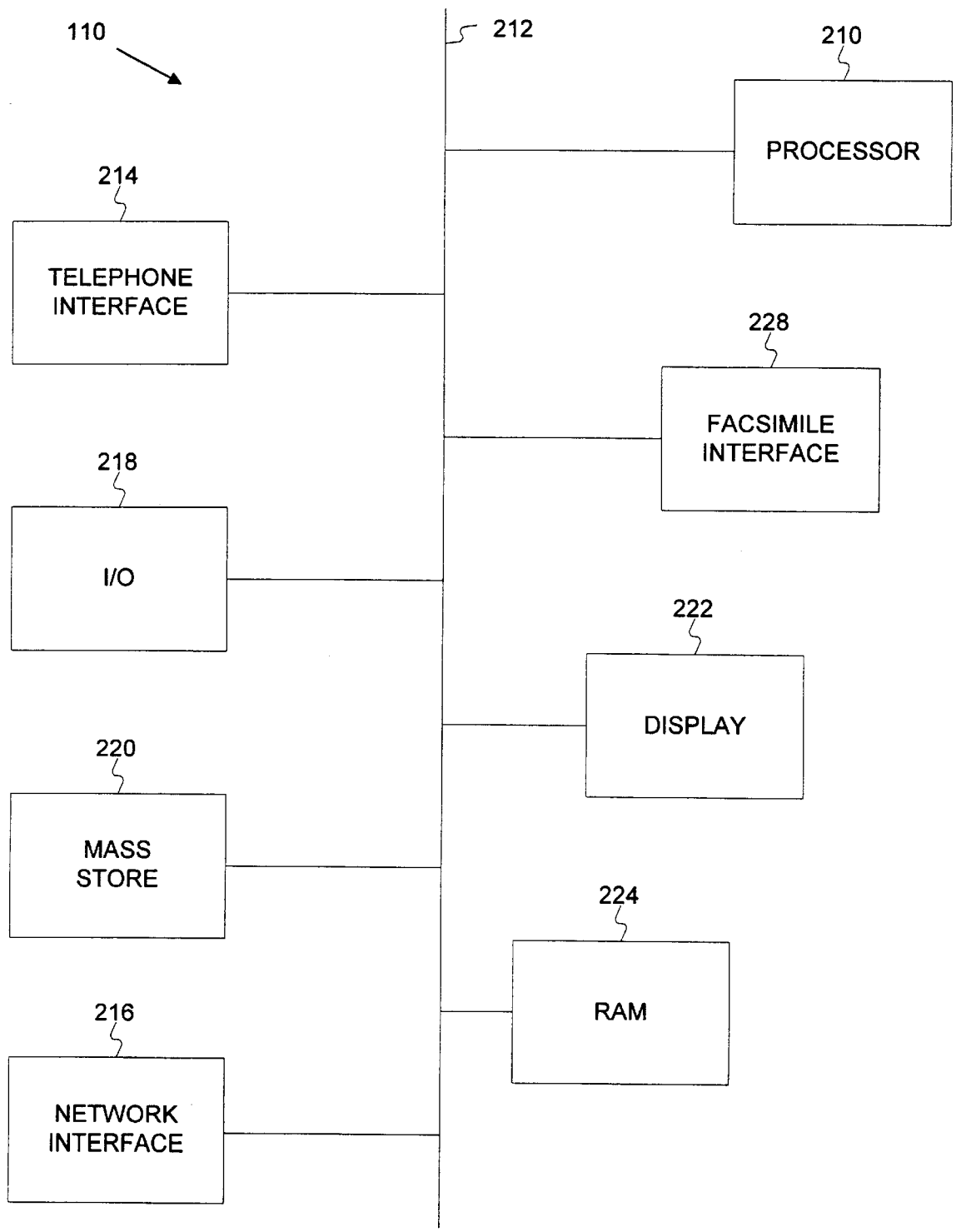
FIG. 2 shows a computer system which may be used to implement the PFB of FIG. 1.

FIG. 2 shows a computer system which may be used to implement PFB 110. PFB 110 is driven by a processor 210, which is connected to several storage and interfacing devices via a bus 212. Storage devices include a mass store 220, a RAM 224, and memory in processor 210 (not shown). These storage devices store some or all of the programs and data necessary for carrying out the functions of the preferred embodiments of the invention.

PFB 11O also includes at least one telephone interface 214 and at least one computer network interface 216. Telephone interface 214 and network interface 216 respectively correspond to telephone interface 128 and network interface 120 of FIG. 1. Although PFB 110 preferably includes several types of telephone and network interfaces, only one example of each is included in FIG. 2 for clarity. These interfaces include the hardware and software necessary to carry out interfacing between PFB 110 and the networks.

PFB 110 also includes a facsimile interface 228, corresponding to interface 132 of FIG. 1. Facsimile interface 228 receives fax information from fax machine 116, and transmits fax information to fax machine 116.

An input/output device 218 is provided and may comprise any well-known communications adaptor or user peripheral interface. A display 222 displays information related to the operation of PFB 110 and may comprise, for example, a simple LCD display or a more complex graphical user interface. Mass store 220 in a preferred embodiment comprises a hard disk drive, but may also be implemented using a RAID system, tape drive, or other mass storage device.

PFB 110 shown in FIG. 2 in a preferred embodiment is implemented on a personal computer, such as a Compaq prolinea, or work station, such as a Sun Sparc. The operating system in a preferred embodiment is implemented using the RTXE operating system or a similar multitasking, multithreaded, real-time operating system.

In the preferred embodiment, the functions of PFB 110 are implemented using "object-oriented" software, the principles of which are well-established. As is known in the art, units of software, known as "objects," are programmed to interact in specified ways to achieve desired functionality. In an object-oriented system there are "classes" of objects, that is, groups of objects sharing a common structure and common behavior. The object-oriented architecture of PFB 110 creates a flexible system which may be easily modified and upgraded by adding or replacing objects in the PFB 110 and on the networks. However, the invention may be practiced using other types of software, as is well-known to those skilled in the software art.

The following discussion first provides an overview of the software, then provides specific examples illustrating principles underlying the hardware and software. Various aspects of PFB 110 are discussed in detail in order to highlight the flexible and powerful nature of the object-oriented PFB 110 system.

Figure 3:
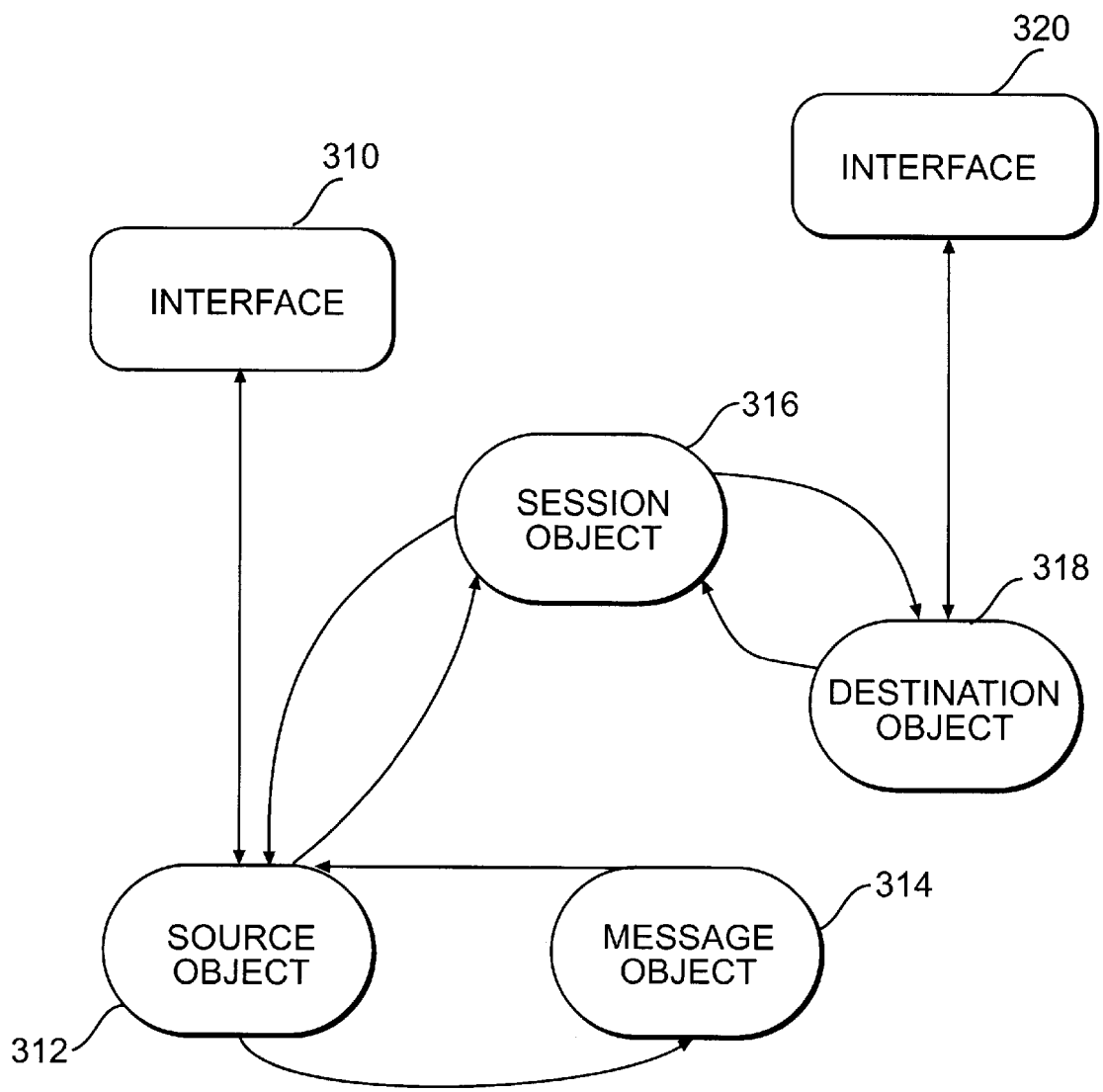
FIG. 3 is a block diagram showing the relationships among the objects of the PFB.

FIG. 3 is a software block diagram showing four objects from three primary object classes which are used in implementing a preferred embodiment of PFB 110. PFB 110 uses the three primary object classes, an interface class, a message class, and a session class, to receive information from a source and transfer the information to a destination. In particular, PFB 110 uses a source object 312, a message object 314, a session object 316, and a destination object 318. Source object 312 and destination object 318 are each examples of the interface class.

A "session" begins when PFB 110 starts receiving incoming information and ends when transmission of the information, and final session procedures are finished. Information can arrive at PFB 110 simultaneously from multiple sources, and multiple sessions can be underway at any time. Each session has a source object 312, a session object 316, and at least one destination object 318.

Interface 310, which corresponds to any of interfaces 214, 228 or 216 of FIG. 2, communicates with source object 312 to transfer incoming information to source object 312. Interface 320, which also corresponds to any of interfaces 214, 228 or 216 of FIG. 2, communicates with destination object 318 to transfer information to a destination. Each of source object 312, session object 316 and destination object 318 create message objects and communicate with each other using the message objects, as is commonly understood in object-oriented processing. This is represented generally in FIG. 3 by message object 314, created by source object 312. The bidirectional communication paths between the objects indicates message object passing between the objects. The objects shown in FIG. 3 are created for each session of source-to-destination transfer. Message objects 314 are discarded by the operating system after the operations they perform are no longer needed or they have served their purpose.

Figure 4:
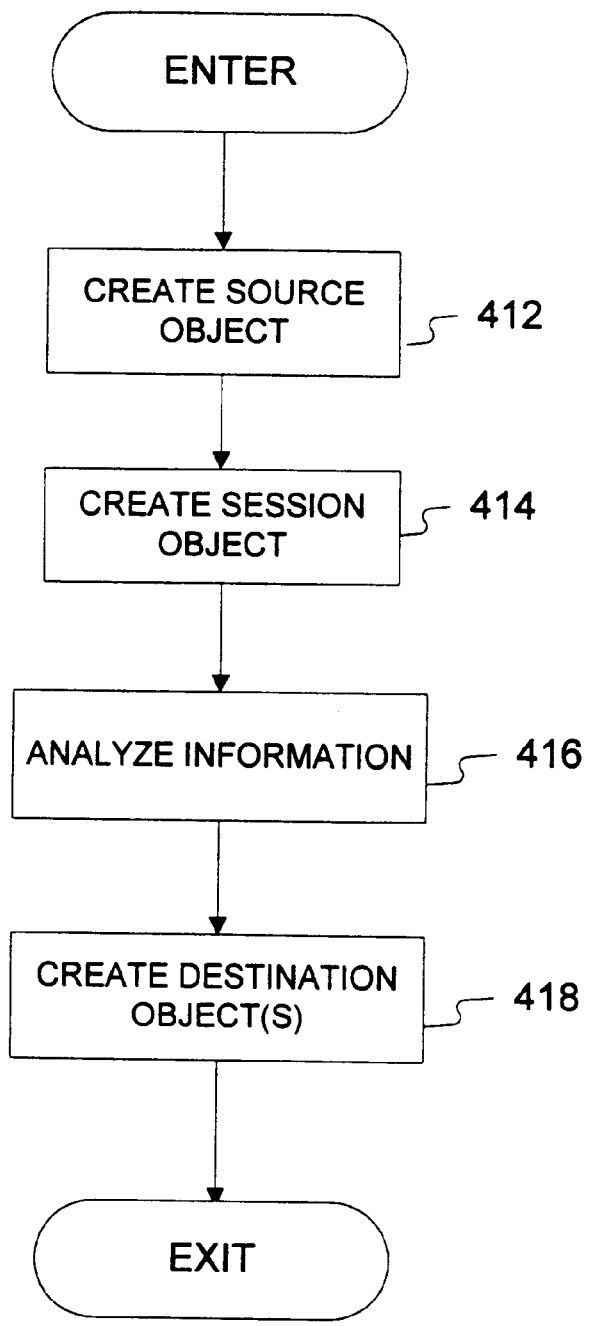
FIGS. 4 and 5 show the overall object processing performed by the PFB.

FIG. 4 is a flow chart showing the creation of source, session, and destination objects in accordance with a preferred embodiment. When an interface, such as interface 132, detects incoming information, it sends a signal to processor 210, which creates a source object 312 (step 412). The source object 312 creates a messsage object (step 413) which may contain either the incoming information or some other message about the incoming information, or both. Source object 312 also creates a session object 316 (step 414), and passes message object 314 to session object 316. Source object 312 continues to create message objects 314 for transferring the incoming information and possibly other information about the incoming information to session object 316.

Session object 316 analyzes the information in message objects 314 from source object 312, until enough information is received to determine destinations for the incoming information (step 416). Session object 316 then creates one or more destination objects 318 based on the determined destinations (step 418).

Figure 5:
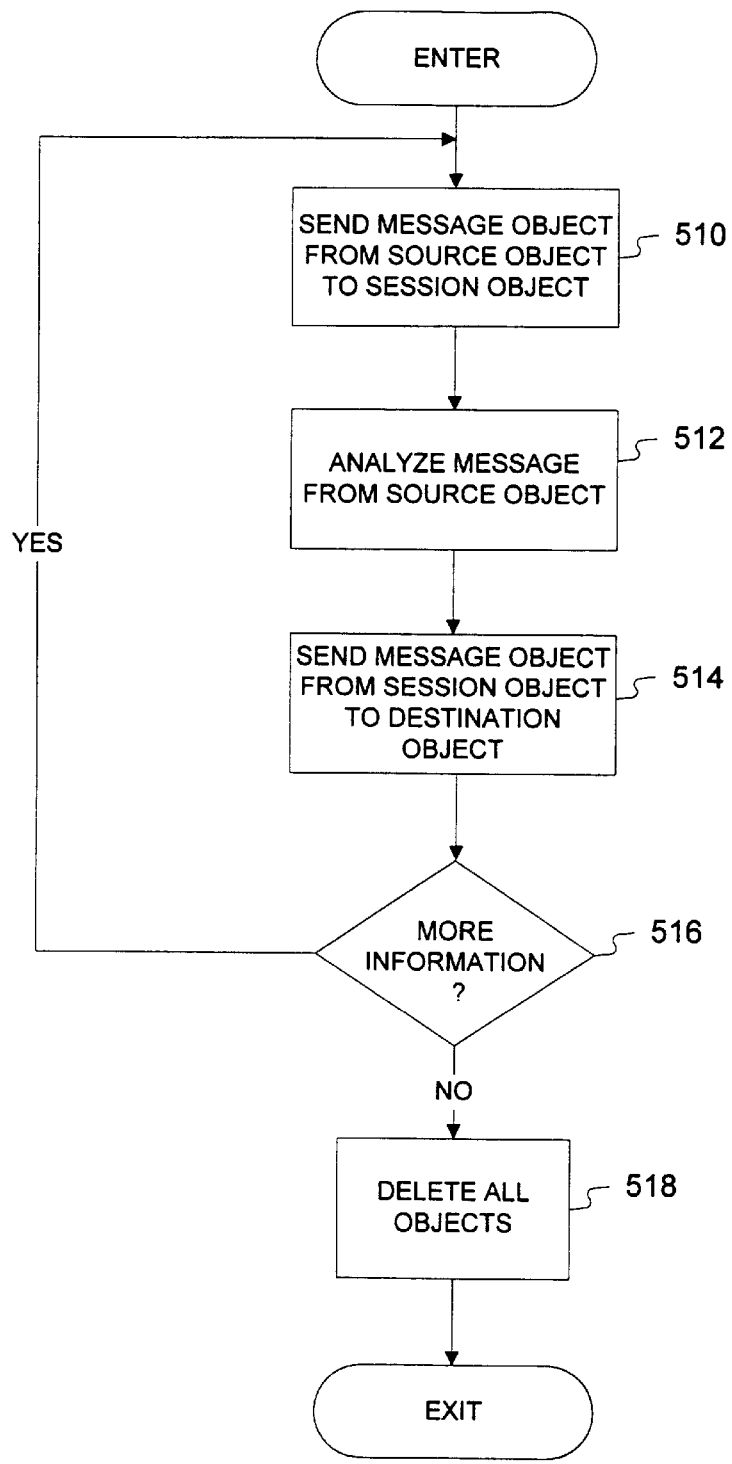

FIG. 5 is flow chart showing the general process of information transfer between the source, session, and destination objects. Source object 312 continues to send message objects 314 containing incoming information, or information about the incoming information, to session object 316 (step 510). Session object 316 analyzes the message objects 314 (step 512), and creates and sends message objects 314 to destination object 318 (step 514). As long as there is information being transferred to or from any of the objects, the process continues (step 516).

When no more information remains to be processed, the interface receiving incoming information sends an end-of-data signal to notify source object 312 that there is no more incoming data. Source object 312 informs session object 316 that there is no more incoming information. Then destination object notifies session object 316 that all information has been translated and transferred. These may occur in any order, or even simultaneously.

All objects are then deleted (step 518) and the session ends. When session object 316 detects that the session has ended, it deletes destination object 318 and informs source object 312 that destination object 318 has been deleted. Source object 312 deletes session object 316 and then sends a request to the operating system software to delete source object 312.

FIGS. 3, 4, and 5 have provided an overview of the object operations in PFB 110. Each object will now be discussed in greater detail.

Source objects 312 handle information transfer from telephone interface 214 and computer interface 216. Each source object 312 is designed to handle information transfer from a particular type of interface, and from particular types of sources connected to the interface. That is, a particular interface may be known to be connected to a particular type of communications line, having one or more particular protocols and one or more particular sources of information. Therefore, when information is received on an interface, a source object 312 for handling the particular protocols and particular sources of information is created.

For example, with respect to FIG. 1, if a fax is being transmitted from fax machine 116, it is received by interface 132. PFB 110 creates a source object 112 of the type designed for transferring fax information from interface 132. The handling of protocol and data for various types of communications lines and information sources is well-known in the art, and will not be detailed here.

Session object 316 has four primary responsibilities: managing a session, logging information about the session, determining destinations for incoming information, and creating one or more destination objects 318. Session object 316 may also perform routing analysis as part of determining destinations.

Figure 6:
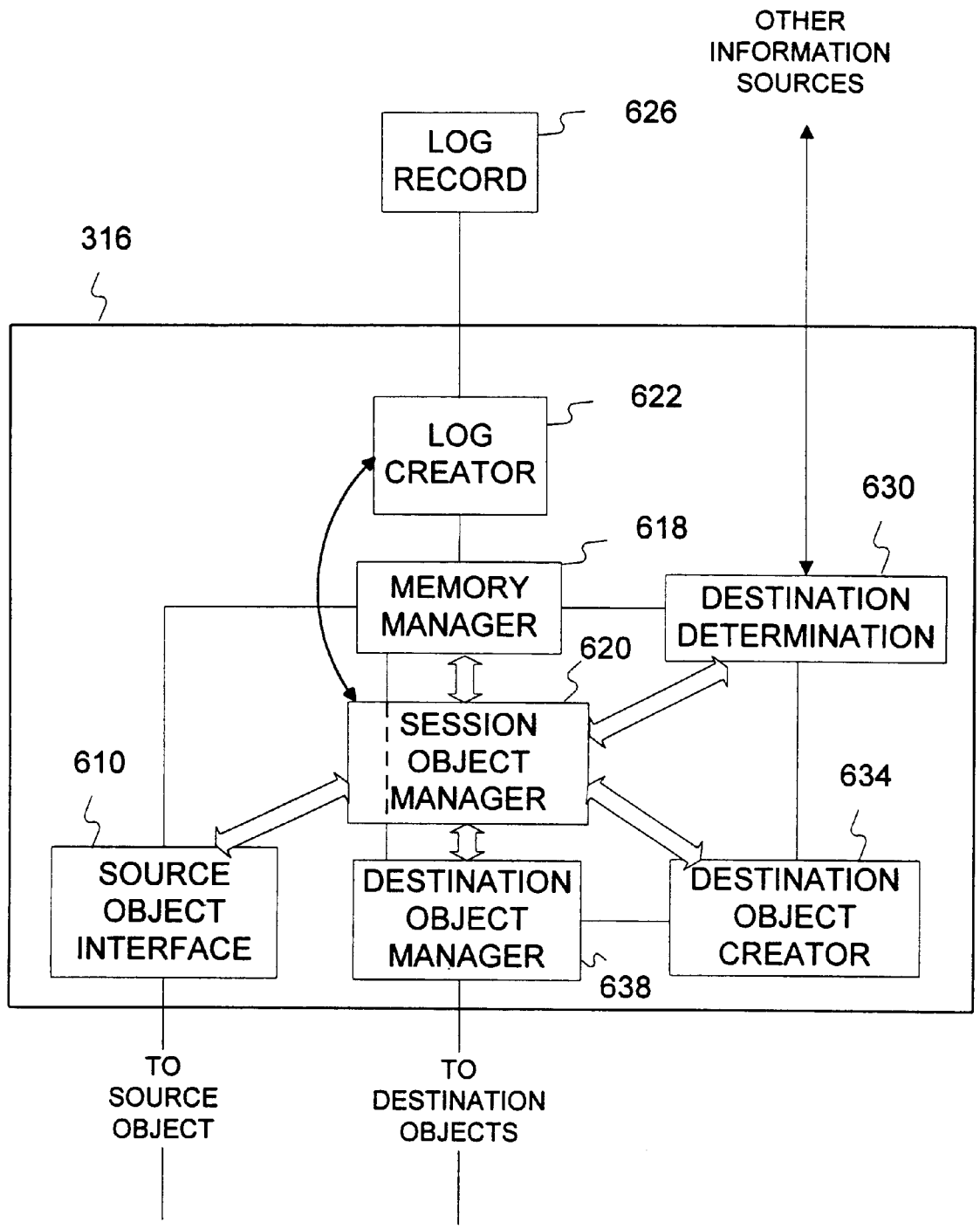
FIG. 6 shows a block diagram of the session object in accordance with a preferred embodiment of the invention.

FIG. 6 is a block diagram showing a preferred embodiment of a session object 316 of FIG. 3. FIG. 6 is only representative of the software processes carried out by a typical session object. In general, session object 316 receives message objects from source objects 312, analyzes the messages to determine destinations, logs information about the session, creates destination objects 318, and performs general monitoring of session object 316. Session object manager 620 monitors and coordinates the activities of session object 316. The remaining blocks show the structures for implementing the primary functions of session object 316.

Messages from source object 312 are received by session object 316 via source object interface 610. The primary purpose of source object interface 610 is to receive messages and pass them on to memory manager 618. Memory manager 618 handles memory storage and accessing for data and other information being transferred by session object 316, as well as data and information necessary for session object 316 processing. Source object interface 610 also transmits messages to the source object as necessary for notifying the source object of particular session object events. For example, session object manager 620 may send a message to the source object via source object interface 610 notifying the source object that the session is over.

Memory manager 618 buffers information from source object interface 610. In a preferred embodiment, information related to the information being transferred by PFB 110 is stored in one area, and other information regarding the session is stored in a separate area. Each element connected to memory manager 618 may use memory manager 618 for retrieving and storing information.

Log creator 622 accesses information by memory manager 618 to create log record 626. Log creator 622 may independently utilize memory manager 618, and may also communicate with session object manager 620 to exchange information.

Destination determination 630 analyzes information received and stored by memory manager 618, including the information received by session object 316 from source object 312, in order to determine destinations of the information. Because memory manager 618 is constantly receiving more information from source object 318, destination determination 630 may need to wait until enough information is received to make a determination of destinations. For example, if the destination is to be determined from performing a character recognition algorithm on an entire page of fax data, destination determination 630 can start processing the information as it comes in to memory manager 618, but will have to wait until all of the fax has been stored before completing the character recognition algorithm.

Destination determination 630 may utilize local structures or remote structures, or combinations of both. For example, destination determination 630 may contain certain determination structures, or they may be stored and accessed by memory manager 618. The structures may also be stored on remote sources, such as directory services or network devices, as indicated by the line leading to "other information sources."

After destination determination 630 has determined the destinations, this information is passed to a destination object creator 634, which creates an object for each destination. Information regarding creation of the objects is passed to a destination object manager 638.

Destination object manager 638 is responsible for transferring the information being stored by memory manager 618 from source object 312 to each destination object 318. Destination object manager 638 also handles any other message passing to or from destination object 318 necessary to carry out the session.

Managing a session includes tracking events in the background during the process of transferring the information, and ensuring that particular sequences are followed. For example, session object 316 ensures that each destination object 318 is created properly, that each receives all of the information to be transmitted, and that each is destroyed at the end. Session object 316 tracks events by monitoring message objects transferred from and to source object 312 and to destination object 318. Tracking includes handling error indications received from either source object 312 or destination object 318, or error indications based on event sequences monitored by session object 316.

Figure 7:
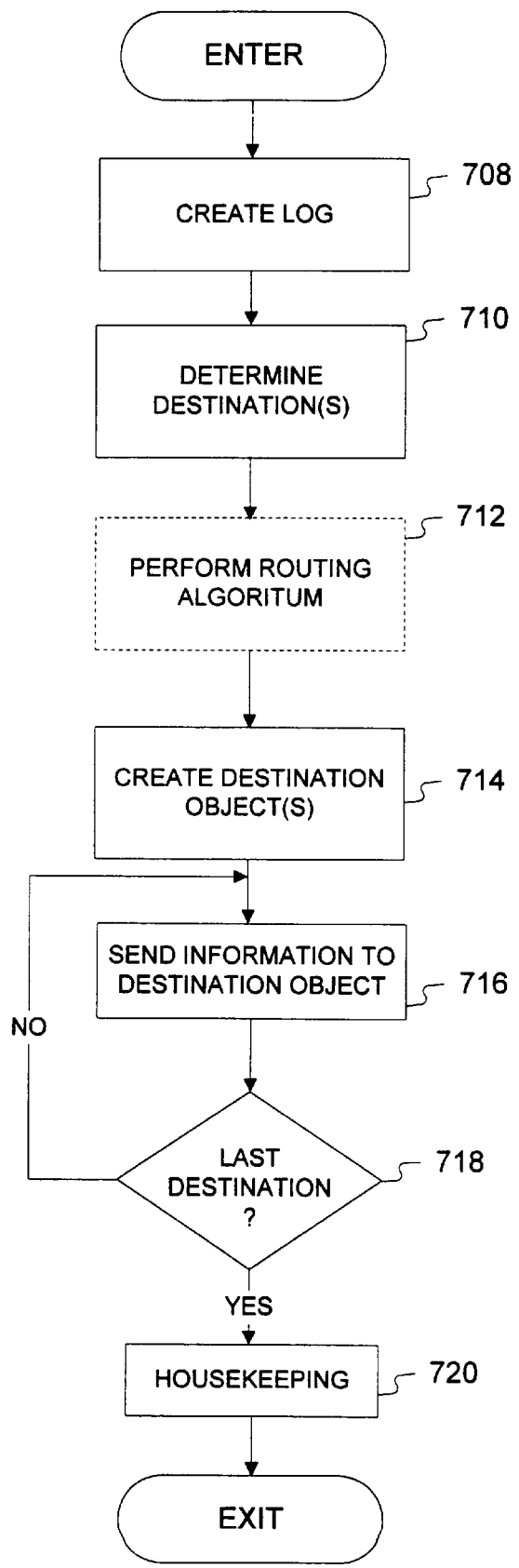
FIG. 7 shows the general session object processing performed in response to receiving information at the PFB.

FIG. 7 is a flow chart showing additional functions performed by session object 316 during a session. Session object 316 initially creates a log (step 708) based on message objects 314 from source object 312. Session object 316 updates the log during the session based on information transferred in message objects 314 passed to or from session object 316. A log record may include simple information such as source identification and time of session start, or more complex information, such as statistical analysis of message context and destination.

Session object 316 then determines the one or more destinations to which the incoming information is to be sent (step 710). Determining destinations may be very simple, such as involved with a fax transmission to another fax machine at a specified telephone number. Alternatively, destination determinations may be more complex, such as a fax transmission intended for a voice mailbox. Session object 316 determines destinations based on information received in message objects 314 from source object 312. It is also possible that session object 316 may determine destinations based on message content, such as an error message, from destination object 318.

Session object 316 then optionally performs a routing algorithm based on the destination information (step 712). The step of performing a routing algorithm is shown in broken line to indicate that this step may not be performed each session. Details of destination determination and performing a routing algorithm will be discussed below.

Session object 316 then creates the necessary destination objects 318 (step 714), and begins transferring the incoming information to each created destination object 318 (step 716) using message objects 314. This process continues until all incoming information has been transferred to each destination object (step 718). The process ends with final housekeeping (step 720), which includes activities to end the session, such as final communication between objects and hardware, deleting objects, getting rid of threads, and logging final information regarding the session. A thread is an individual unit of execution—a single series of instructions that execute in a logical sequence.

Figure 8:
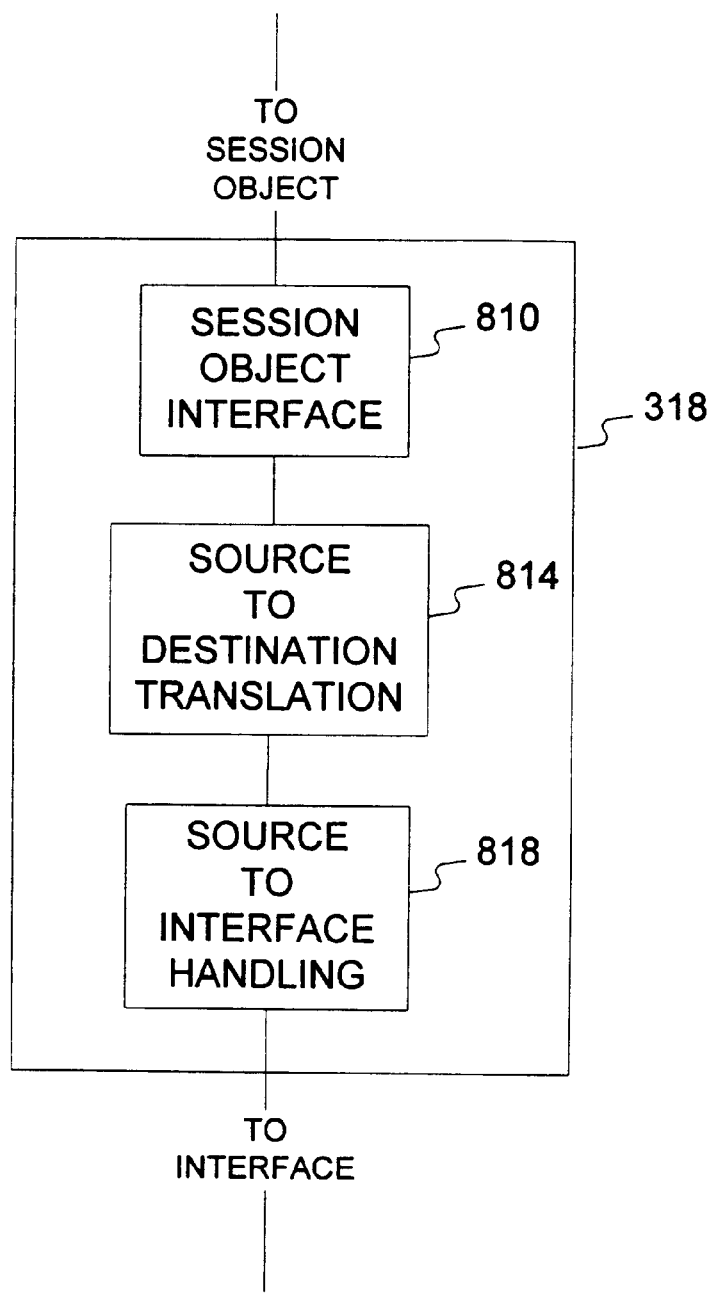
FIG. 8 is a block diagram showing an architecture of the destination object in accordance with a preferred embodiment of the invention.

FIG. 8 is a block diagram showing the structure of a destination object 318 of FIG. 8. Destination object 318 communicates with session object 316 using session object interface 810. Information is received from the session object 316, and is passed to source to destination translation 814. Source to destination translation 814 performs the necessary data and protocol translations necessary for transmitting the information to a particular destination. Finally, a source-to-interface handling element 818 passes the translated information from source-to-destination translation 814 to the hardware interface associated with destination object 318. Further details regarding the function of destination object 318 are outlined below.

Destination objects thus handle information translation and transfer to interfaces, such as telephone interface 214 and computer interface 216. Each created destination object 318 corresponds to a particular source-to-destination protocol and data translation required for transferring the incoming information to a determined destination using a particular interface. For example, if the source is fax machine 116, and the destination is an E-mail box on the Internet, the destination object created for this session translates telephone protocol to Internet protocol, and fax data to E-mail data.

Fax transmissions consist of scan line data. The translation of scan line fax data to E-mail data may occur in a variety of ways, depending upon the needs of a particular destination. For example, the scan line fax data could merely be encapsulated, and sent as a graphic image within an E-mail. Alternatively, the scan line fax data could be converted to a graphics format, such as a TIF or GIF format, or converted to text using character recognition techniques well-known in the art.

A more detailed example illustrates how PFB 110 handles information transfer. If an operator of fax machine 116 wishes to send a fax, the operator keys in a phone number to fax machine 116, presses a dial key button and the start key. This causes a modem in fax machine 116 to go off hook. The off-hook condition is detected by the circuitry in interface 132. Interface 132 generates a dial tone back to fax machine 116, in the same manner as if fax machine 116 were connected to the regular switched public telephone network.

Fax machine 116 then transmits the dialing tones of the destination number, which are detected by interface 132. From the dialing tones, interface 132 determines the destination number for the fax. Interface 132 then transmits the appropriate signals, and fax machine 116 begins transmitting fax data, which is captured by PFB 110. PFB 110 then creates source object 312 for the fax information being received. Source object 312 then creates session object 316 and a message object 314 having the destination phone number and other information related to the source interface (in this case the fax interface) The message object 314 is transferred to session object 316 to inform session object 316 that the initiating event is an incoming fax. Session object 316 continues receiving and analyzing message objects 314 from source object 312 until enough information is received to determine the one or more destinations.

Upon determining the destinations, session object 316 creates appropriate destination objects 318, and begins sending message objects 314 to destination object 318. Destination object 318 sets up the communication for information transmission with the corresponding hardware interface. Information continues to flow from the fax machine and through the objects until the transmission is complete.

Destination determination by session object 316 may be as simple as transferring information arriving at an interface directly to a destination. Alternatively, destination determination may involve more complex analysis, involving processing of the incoming information to derive destination information. The following discussion provides details of destination determination algorithms which may be performed by session object 316.

Figure 9:
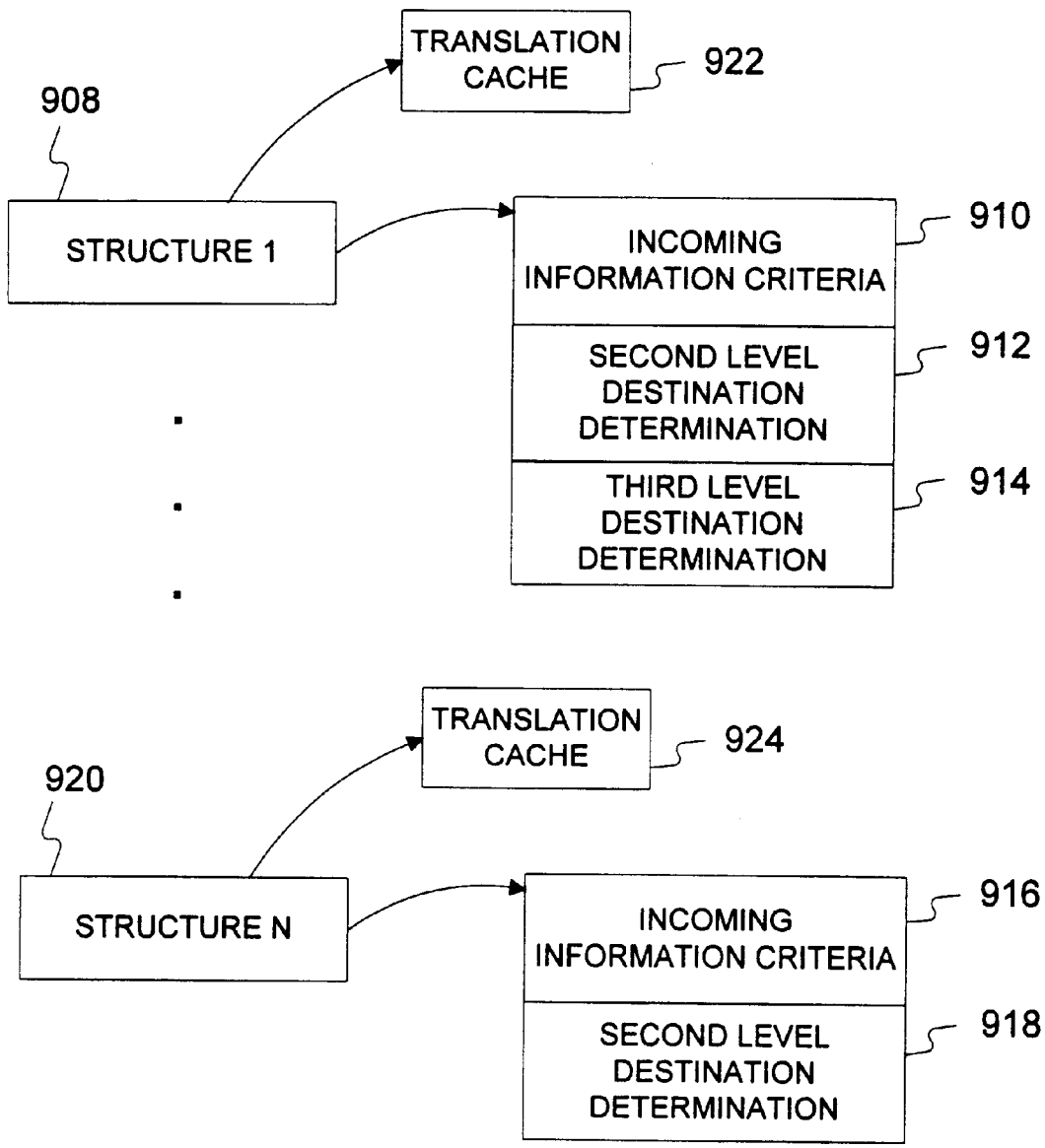
FIG. 9 is a block diagram showing a destination determination data structure used by objects of FIGS. 4 and 5.

FIG. 9 is a block diagram showing destination determination structures used by session object 316 to determine destinations for incoming information. In the example shown, structure pointers 908 and 920 are used to access respective incoming information criteria (910 and 916), and further levels of destination determination information (912, 914, and 918). The incoming information criteria, such as 910, provides criteria to session object 316 defining how the incoming information, including protocol, data, or both, are to be analyzed.

Structure pointers 908 and 920 also point to translation caches 922 and 924, respectively. Translation caches 922 and 924 hold recent resolved destination determinations for the corresponding destination determination structures, and are managed by session objects 316. These caches may be used by session objects 316 to assist in resolving destinations, and may be used to resolve destinations at any stage in the process of destination determination. For example, if a first destination has been determined using incoming information criteria 910, this may be checked against translation cache 922 to see if a recent previous same destination has already been analyzed. Caching recently resolved destinations may relieve session object 316 from performing extensive further analysis.

Structure pointers 908 and 920 are representative only. The destination structures may be accessed by any memory structure accessing method. For example, pointers could be used to reach entity.

Each level of destination determination structures may include data and programs, including algorithms, which are used by session object 316 to determine destinations. These may be as simple as associating a source with a destination, or as complex as an algorithmic scheme.

For example, for information coming from the Internet via computer network interface 120, incoming information criteria 910 defines how specific fields of the Internet protocol are to be analyzed for destination determination, and how the data portion of the Internet information is to be analyzed for destination determination. For example, the criteria might specify that all incoming Internet information having a particular value in a particular field should be sent to a fax machine on telephone network 124.

FIG. 9 shows second level destination determination criteria, 912 and 918, and third level destination determination criteria 914. These further levels, which may not always be present in a structure, are representative of destination determinations beyond simple protocol and data analysis of the incoming information. For example, a further level might require that, with respect to the destinations determined based on incoming criteria 910, all faxes to destination Y should instead be routed to Internet address X.

Another example of further level destination determination is a least cost routing analysis. For example, if the incoming information is determined to be going to a particular destination, session object 316 may analyze the destination to determine which communicative route would be least expensive based on known route cost information. Cost may be in terms of time or other criteria, such as load.

A structure 908 and 920 may be stored locally in PFB 110, remotely on the network, or portions may be distributed on the PFB 110 and on networks. Furthermore, the structures may exist in whole or in part in the session object 316.

Session object 316 may obtain destination structures 908, 920 of FIG. 9 in a variety of ways. First, session object 316 may be given information, such as the structure 908, in a message object 314. This pointer defines where to access the destination structures. Secondly, session object 316 may be created already having the destination determination structures, or having information necessary to locate them.

In summary, the destination determination structures stored in, for example, RAM 224, define how incoming information protocol and data are to be analyzed to determine destinations. The structures are preferably centralized in PFB 110, but may be distributed. In the preferred embodiment, they are located in session object 316, but may be wholly or partially located elsewhere in PFB 110, or on the networks. Session object 316 preferably accesses the destination structures under direction of information in message objects 314 from source object 312, but may do so based on information in the session object 316 at the time of creation.

Destination structures may be input or modified in several ways, using the user interface elements such as display 222, I/O 218 or interfaces 214 and 216. For example, they may be input to PFB 110 by a system administrator or user through common interfaces, such as a telephone or a Web browser, or may be changed dynamically by PFB 110. Modification of destination structures is also object-oriented. In general, PFB 110 creates an object in response to user input, and the object carries out the requests. One or more objects are then used to implement the modifications.

Destination structures may also change dynamically by having further destination level criteria which changes itself according to some monitored condition. For example, second level destination determination information 912 could be defined to change from one criteria to another based on a certain date.

The variety of associations and analyses which may be performed on incoming information is immense. These associations and analyses can be divided into the following criteria categories: protocol, data, time, source, destination, and cost. Although some criteria are related, and may overlap in certain circumstances, an important feature of the invention is that destination structures used by session object 316 may associate virtually any destination with these criteria, or combinations of these criteria. The following discussion provides examples of data and programs/analyses which may be used in the destination structures.

An example of using data criteria for information processing is for session object 316 to analyze incoming fax information for particular information. If the particular information is found, the fax message is sent to a destination associated with the particular information. There are several standards and methods for adding addressing information as part of fax information. The particular information may be in the body of the fax or on the fax cover page.

Another example is size of incoming information. The destination criteria in the destination structure may specify that incoming information having a data portion smaller than 2000 bytes (2K) should be routed to fax machine X, and anything larger be routed to fax machine Y. In this embodiment, session object 316 buffers up to 2K of data so the determination can be made.

An example of source criteria for information processing is "caller ID." Caller ID is a way of determining the source of a call, which is now a common telephone service. For incoming information from telephone network 124, destination structures may require using caller ID information for destination determination. A similar feature can be implemented on information arriving at PFB 110 via the Internet. A network address identifying the Internet source is used to determine further destination processing. Thus, destination structures may be defined which send information for one initially specified particular destination to be sent to an entirely different destination.

PFB 110 may also use a form of Direct Inward Dialing (DID). Specific phone numbers are assigned to specific individuals, even though all of the numbers ring a single telephone connection at an interface of PFB 110. The actual dialed number is included with an incoming fax, enabling specific identification of the person to whom the fax should be delivered.

The use of "pseudo telephone numbers" expands the concept of DID and empowers users to make assignments that are normally only handled by phone companies. For example, the session object 316 which is created in response to incoming fax information from fax machine 116 may use a destination structure which directs it to convert particular fax destination addresses to E-mail addresses. The telephone number thus has become a pseudo number of an E-mail box.

A more complex example illustrates the power of the destination structures used by session objects 316. In this example, each PFB has a TCP/IP address (a unique identifier assigned to each computer on the Internet), and has a routing table which defines destinations. Other PFBs receive these routing tables for use with their own destination structures in two ways. First, a PFB can query another PFB dynamically. Secondly, a PFB may query a directory system contained in a computer connected to the Internet which stores the routing tables.

In this example, a session object 316 in a New York PFB receives information from source object 312, and the associated incoming information criteria 910 in the destination structure directs session object 316 to search the received information for destinations. The destination structure further specifies that if Paris is found as a destination, session object 316 should find another PFB having the capability of transmitting to Paris.

The session object 316 performs this by searching the routing tables already received by the PFB, by querying other PFBs for their routing tables, or by contacting the directory system (or a combination of these). Session object 316 finds a routing table of a London pFB which specifies that it can reach any telephone in country codes 44 (UK) and 33 (France). The session object 316 creates the appropriate destination object 318 for transmission of the information to the London PFB which transmits to Paris.

Destination structures can also direct session objects 316 to use "directory services" to resolve destination information. Directory services are computers connected to the Internet, such as name servers or directory servers. The general concept is that a name is sent to a directory service, and an Internet network identification address is returned. Destination structures used by session object 316 may require session object 316 to retrieve a network address using a directory service.

For example, when an incoming fax message including a destination telephone number is received by session object 316, and the incoming message is from a telephone line, session object 316 may be directed by destination structures to check recent routing information to see if the destination associated with the destination number is known (e.g., from a translation cache 922). If not, session object 316 may be directed by destination structures to send out a directory services query. The results of the directory services query, based upon the destination number, is either a destination address or an "I don't know" response. In the latter case, a default action would be carried out by session object 316 and destination object 318, such as dialing the destination number on a telephone interface.

If directory services returns an address, session object 316 creates a destination object 318 to send a fax to that address. For example, if the address is an address on the Internet (e.g., another PFB), the fax may be converted to E-mail format by destination object 318, and sent over the network connection for arrival at the destination. The destination may be responsible for additional routing, if necessary.

For example, if a telephone number is sent to a directory service, session object 316 may receive from the service a straight Internet Protocol (IP) address. Based on this address, session object 316 may be directed by the destination structure to merely send the information over to another PFB, and that PFB would be responsible for handling the information. Or, the destination received from the directory service might be a mail server. Session object 316 recognizes that this received information is a mail box address.

If a "don't know" is received from the directory service, destination structures may direct session object 316 to analyze the destination number of the incoming message to determine other numbers which can be used to route the information to the appropriate destination. This might include other numbers in a corporation, other PFB numbers, etc.

A destination structure used by session object 316 to resolve destinations may also map dialed telephone numbers to E-mail destinations, or into a list of other numbers, each of which will be resolved into a destination address. In this way, a fax machine user needs to only dial numbers as they normally would to send faxes, E-mail, or combinations of the two.

After final destinations have been determined, information from the source is sent to destination object 318, which performs the final processing for the destination. Several examples will serve to illustrate the information processing performed by destination objects 318.

One subclass of destination objects 318 converts protocol and data of E-mail to faxes. For E-mail containing rich text or embedded objects, this requires destination object 318 to convert from rich text or embedded objects to fax information.

Outgoing faxes may be processed by destination objects 318. For example, the outgoing cover page may be altered to insert graphic elements, insert routing information in the form of bar codes, fill-in boxes and printable text with alignment cues, perform a specific algorithms for translating PSTN addresses (phone numbers) into Internet or E-mail addresses, and use extra digits to specify routing information which is included in subsequent transmission.

Figure 10:
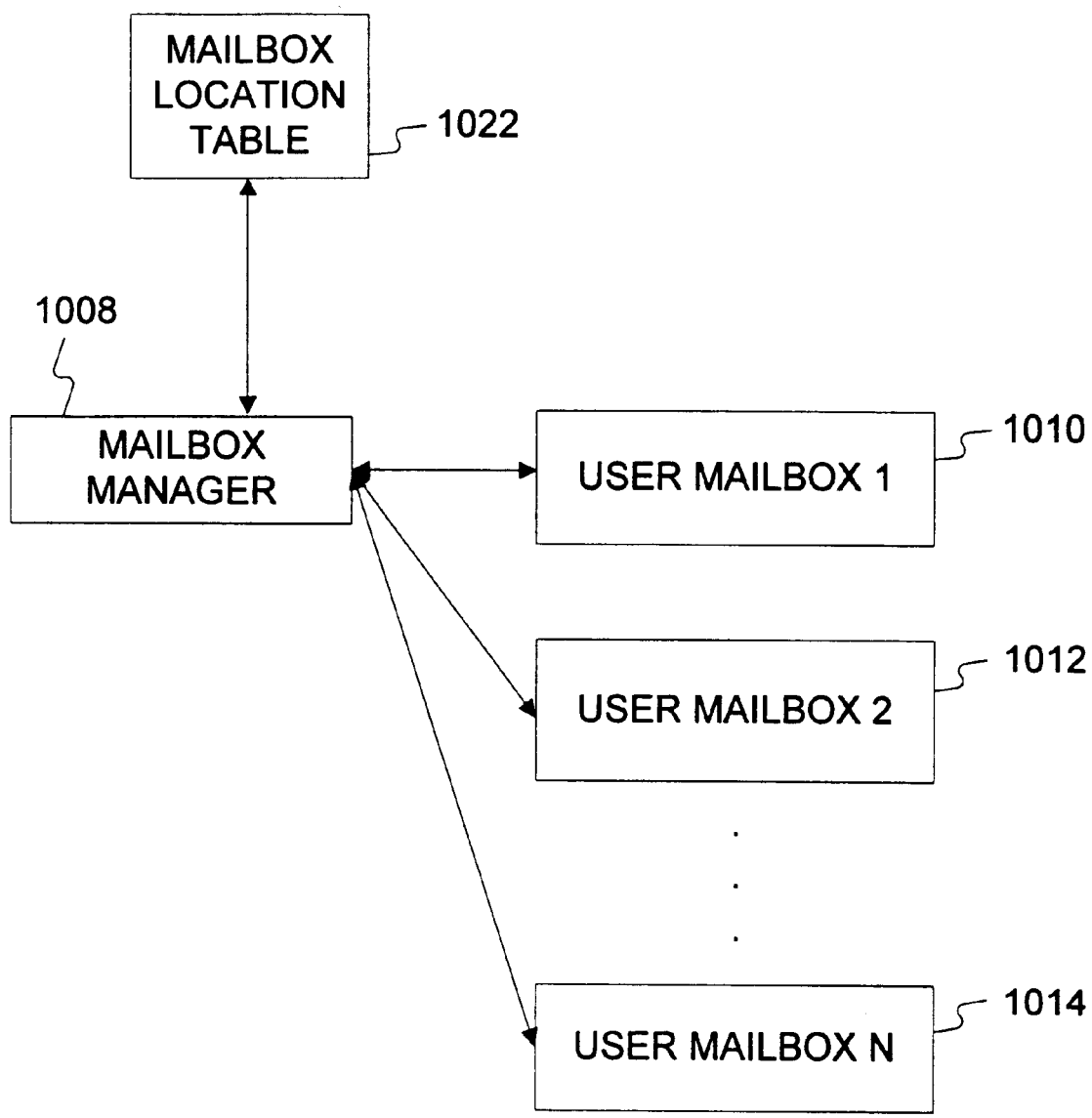
FIG. 10 is a block diagram showing the mailbox system in accordance with a preferred embodiment of the present invention.

FIG. 10 shows a mailbox system which may optionally reside in PFB 110. Mailbox manager 1008 is a software application module which manages mailboxes 1010, 1012 . . . 1014. The mailboxes may be stored locally on PFB 110, or remotely on a network. Mailbox manager 1008 maintains mailbox location table 1022 to keep track of the location of each mailbox. This is implemented by simply associating a destination identifier with a location of the mailbox. Mailbox manager 1008 also handles retrieval requests and storing requests for the mailboxes.

For example, if mailbox 1010 is a destination for information arriving at PFB 110, the destination object 318 transfers the information to mailbox manager 1008 for storage in the mailbox associated with the destination.

In this way, inbound faxes can be stored in personal mailboxes for retrieval with codes keyed in on the fax machine. That is, when a user begins pressing keys on fax machine 116, a source object is created, which creates session object 316. Session object 316 recognizes certain dial tones entered into fax machine 116 as mailbox access tones. In response, session object creates a second source object 312 to retrieve information from mailbox manager 1008. This sets up the usual cycle of session object creation, destination object creation, and information transfer from the mailbox to the fax machine or other destination as directed by the user.

This allows for delayed printing, which helps keep faxes from being seen by other than the intended recipient. Caching of received faxes, however, also allows a user to retrieve and view faxes over the Internet, or to reroute them as E-mail.

Another example illustrates how faxes in a corporate structure may be redirected several times based on destination, perhaps a company sends a lot of faxes to Brazil. Outgoing faxes are routed to the PFB at the company's Miami location. This routing is performed by session object 316, in accordance with the destination structures, directing all faxes with the Brazil country code in the destination number to the Miami PFB.

The Miami PFB has destination determination structures which require, for example, that if certain fax numbers require that, MCI mail should be used and the fax is delivered as text to MCI mail. Destination numbers of other messages result in the message being routed in the normal manner over the telephone network.

PFB 110 can also operate in a direct mode over a communications path, such as the Internet. Instead of using E-mail transport, a direct connection between two PFB-equipped fax machines takes place over the Internet or other network.

This is performed by sending a fax at a fax machine connected to a first PFB. The session object 316, created at the first PFB in response to the incoming fax, creates a destination object 318, which translates the incoming fax information to an Internet protocol, and transmits the fax information over the Internet to a second PFB. A session object 316 at the receiving end, created by a source object 312 in response to the incoming information, creates a destination object 318, which converts the fax information from the Internet protocol back to fax protocol, and sends the fax information to the fax machine at the second pFB. This process, of course, includes converting fax scan line information to a format compatible with the network protocol requirements, which may require dividing the fax scan line information into segments. On the receiving end, session object 316 buffers the information and reconverts it back to scan line fax information.

Destination determination structures may also utilize dialing "masks" or "wildcards" to describe a wide area to reduce the number of routing entries to be entered or maintained. For example, incoming information criteria 910 could be set up to requiring that all faxes to Northern Virginia be redirected. This would be carried out by using a dialing mask a program in the destination structure which specifies that all faxes from fax 116 having destination numbers with 703-???-???? should be redirected (?=don't care).

As another example, a company may have several PFBs for its US offices. A PFB in Los Angeles may be set up to accepts all fax traffic for area codes 818, 213, 310, 714, 805, and 909. A PFB in New York accepts fax traffic for area codes 212, 201, 506, and 914.

In a preferred embodiment, destination object 318 implements a point-to-point protocol (PPP). PPP is a well-known data link protocol utilizing multiprotocol framing for transferring information. PPP also uses a link control protocol for establishing and releasing connections. Finally, PPP utilizes a different network control protocol (NCP) for each network layer which is supported.

PPP allows a user to place a telephone call to an Internet service provider (ISP) to establish a home pC connection through a temporary host. The home PC calls the ISP over the telephone lines, and performs some initializing to set up the parameters of the protocol for the connection. Then the home PC receives a temporary Ip address. Using this IP address, the home PC can send and receive IP packets, basically acting just like a host. Once the necessary transfers have been made, the connection is released. The particular implementation details of PPP are well-established in the prior art.

Figure 11:
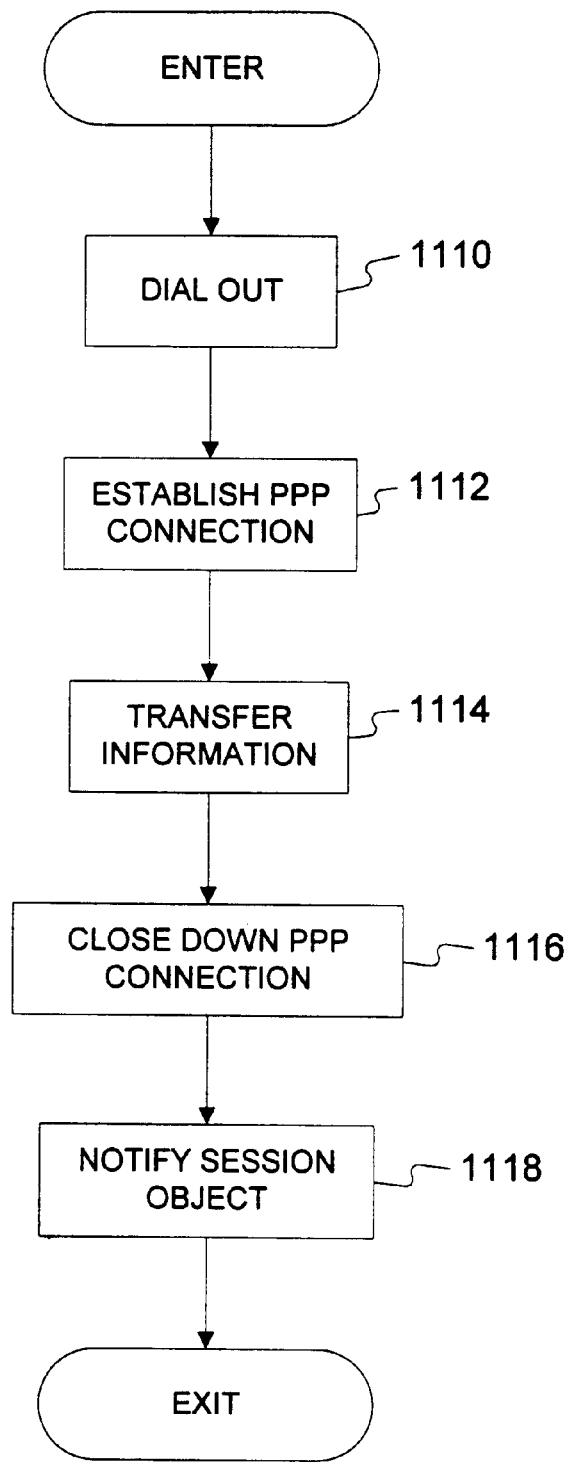
FIG. 11 is a flow chart showing object processing for performing a PFB connection.

FIG. 11 is a flowchart showing processing performed by a PPP destination object to carry out PPP transfers in accordance with a preferred embodiment of the present invention. Prior to destination object being created, session object 316 has established that an incoming fax or e-mail has a destination which requires a particular PPP destination object 318. Upon being created, PPP destination object 318 receives from session object 316 the dial out number required to establish the PPP connection. Alternatively, PPP object 318 may already have the necessary PPP dial out number necessary for the connection set up. In either case, PPP object 318 dials out over a standard "plain old telephone system" (POTS) port (step 1110) and establishes the PPP connection (step 1112).

After the initial setup is handled to establish the PPP connection, PPP destination object 318 transmits information received from session object 316 over the established link to the appropriate destination until all information has been transferred (step 1114 ). As discussed above, the information is transferred in the appropriate format, translated if necessary, by PPP destination object 318 to interface 320 and the destination. PPP destination object 318 then closes down the PPP connection (step 1116), and notifies session object 316 that operations are finished (step 1118).

Figure 12:
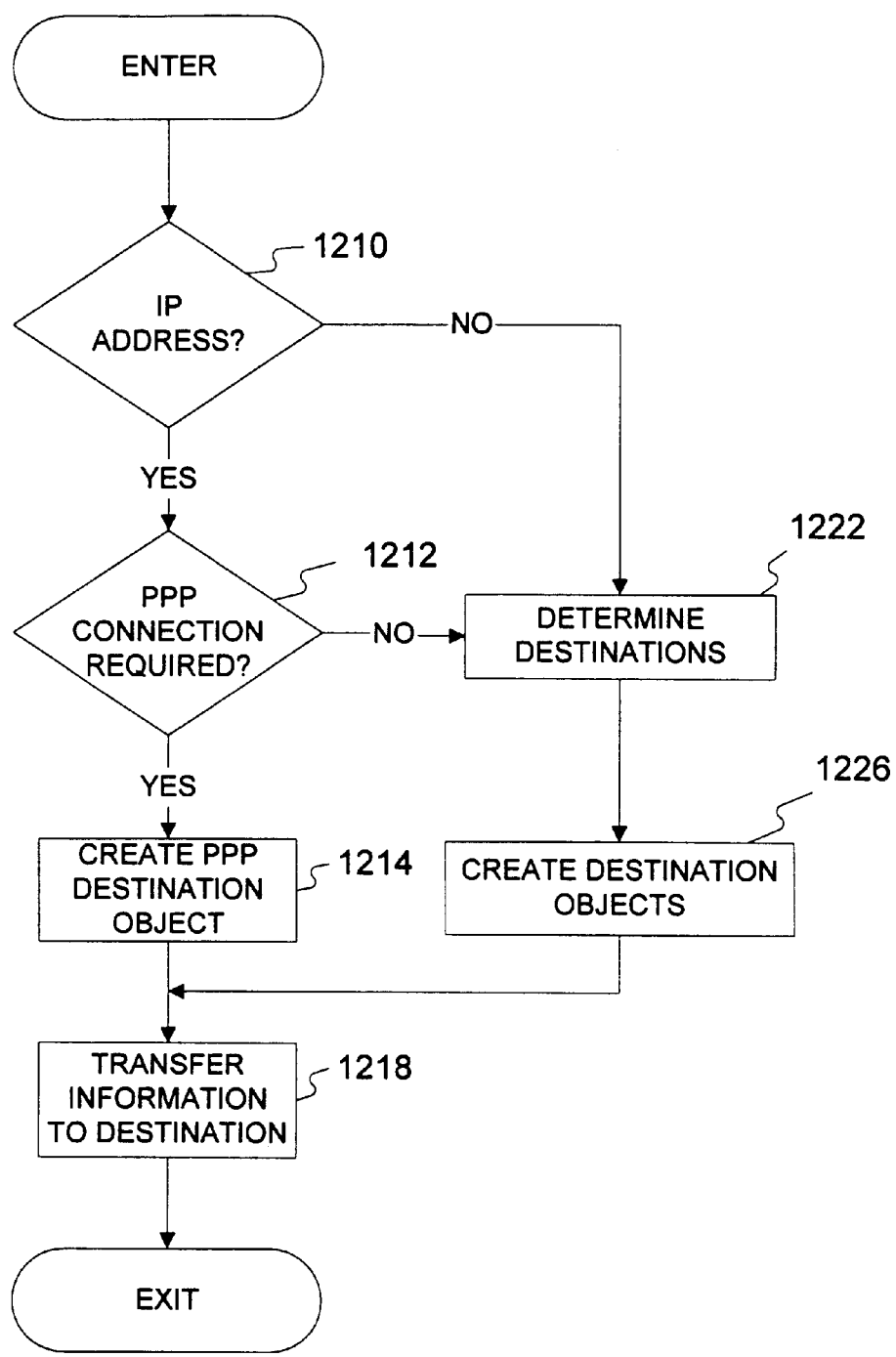
FIG. 12 is a flow chart showing point-to-point protocol connection determination.

FIG. 12 is a flow chart showing processing of a preferred embodiment which handles incoming IP addresses using PPP connections. As discussed above, interfaces 310 and 320 may be Ethernet ports. In this preferred embodiment, PFB 110 is connected to both an Ethernet and to one or more computers, via direct or network connections. Initially, PFB 110 receives information over interface 310, creates an appropriate source object 312 and session object 316. If session object 316 receives an IP destination address from the Ethernet or computer (step 1210), session object 316 determines whether the IP address requires a PPP connection (step 1212).

This may be determined in a variety of ways. For example, the IP address may be compared against known Ip addresses which require ppp connections. Alternatively, the IP address may be checked against known IP addresses not requiring a PPP connection, and if the IP address is not found, it is assumed a PPP connection is required. If a PPP connection is required, a PPP destination object 318 is created, and the procedures outlined above with respect to FIG. 11 are followed (step 1214). If the incoming information is not an IP address (step 1210), then destinations must be determined (step 1222), and destination objects must be created (step 1226).

Figure 13:
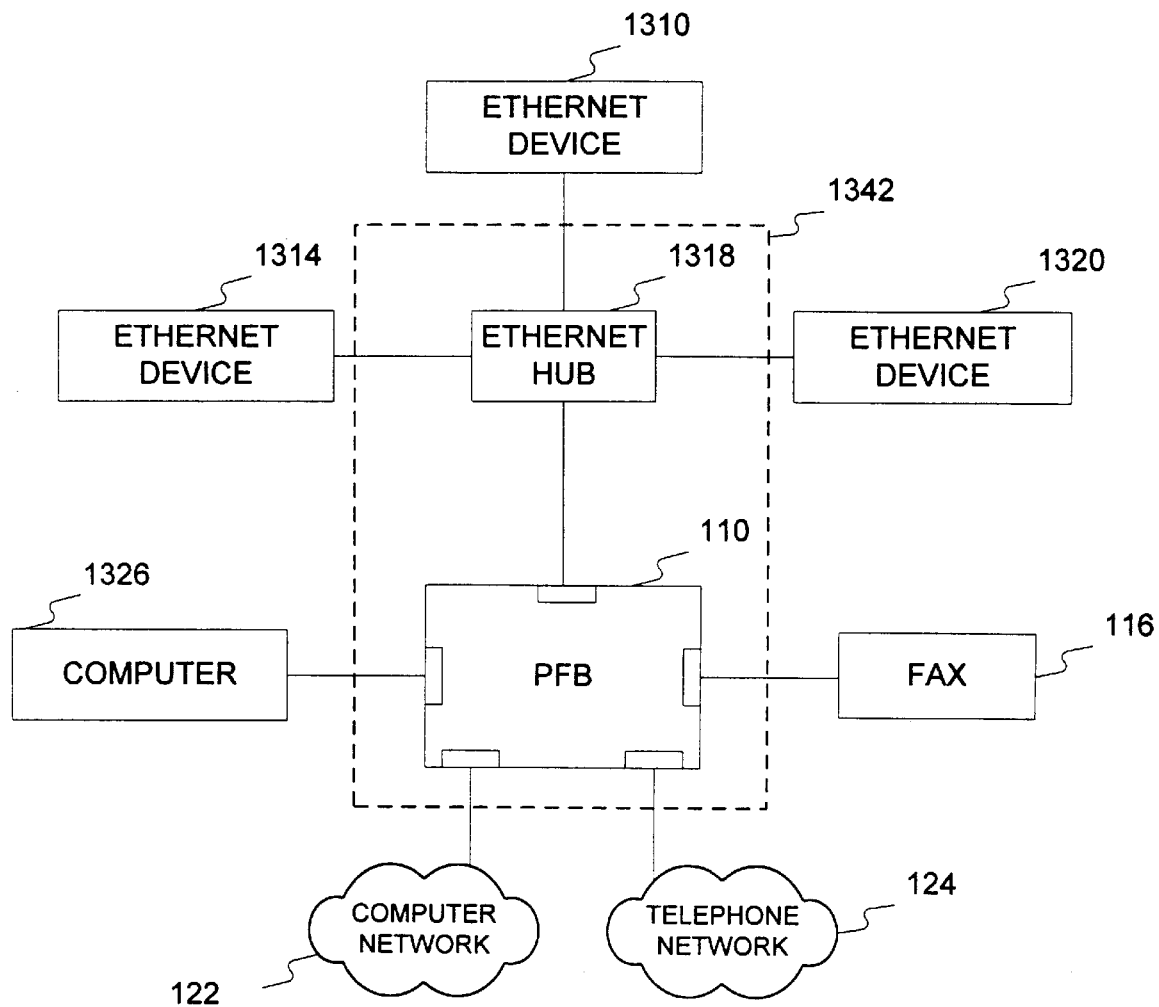
FIG. 13 is a block diagram showing another preferred embodiment architecture using the PFB in accordance with the present invention.

FIG. 13 is a block diagram showing a system using a PFB in accordance with a preferred embodiment of the invention. In this embodiment, a PFB 110 is connected to various entities, such as computer 1326, computer network 122, telephone network 124, and fax machine 116, similar to the system of FIG. 1. The embodiment of FIG. 13 also includes an Ethernet hub 1318, which is connected to several Ethernet devices 1314, 1310, and 1320.

As is well known to those skilled in the art, an Ethernet hub 1318 is also connected to PFB 110. In this architecture, Ethernet hub 1318 routes all incoming traffic to the other remaining devices connected to the hub, as is commonly understood in the art. In this embodiment, however, Ethernet devices 1314, 1310 and 1320, as well as devices connected to PFB 110 (1326, 122, 124 and 116), may all take advantage of the features of PFB 110, as described above.

As shown in broken line in FIG. 13, a preferred embodiment includes Ethernet hub 1318 and PFB 110 in a single device 1342. This configuration permits a user to implement a network using a variety of Ethernet and non-Ethernet devices connected to a single network box, thereby enabling a variety of protocol conversions and destination routing using an Ethernet hub architecture. This provides a plug-and-play local area network without requiring servers.

Figure 14:
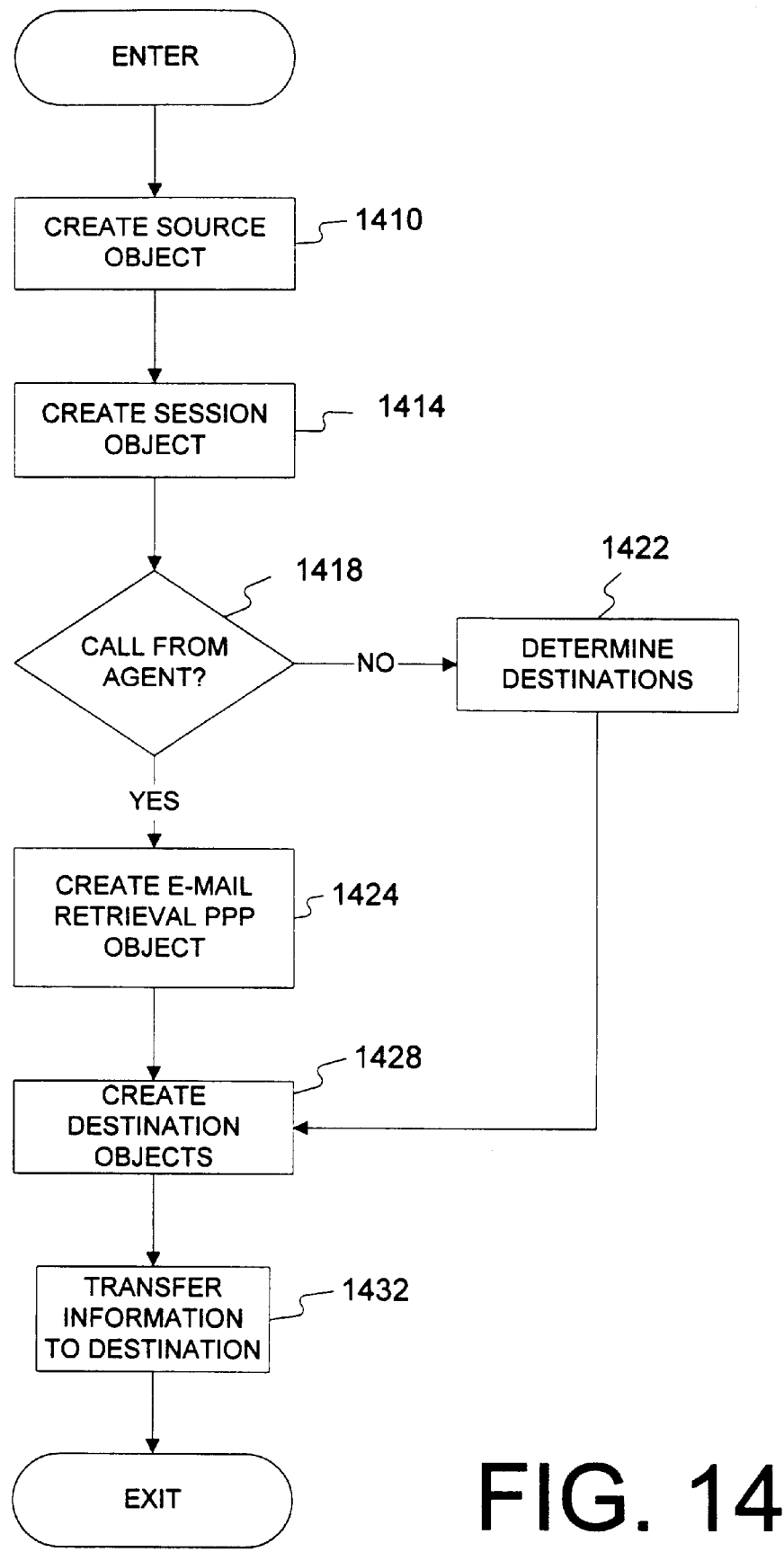
FIG. 14 is a flow chart showing processing required to respond to notification from an agent that e-mail has arrived.

FIG. 14 is a flow chart showing processing in another embodiment where PFB 110 receives notifications of e-mail and, in response, sets up a PPP connection to retrieve the e-mail. In this embodiment, an agent monitors an e-mail server on the network for incoming e-mail. As is well known to those skilled in the art, an "agent" is a part of a networked system which performs information preparation and exchange on behalf of a software or hardware entity. Upon receiving an indication that e-mail has arrived, the agent calls PFB 110. In response, PFB 110 creates source object 312 (step 1410) which creates session object 316 (step 1414). Session object 316 determines that the incoming call is from the agent (step 1418). This determination may be made in several ways. For example, session object 316 may check caller ID and identify the call source as the agent. Alternatively, the agent may hang up after one ring, which is also detected by session object 316.

If it is determined that the call is not from an agent, processing proceeds to determine destinations (step 1422). This is followed by creation of the appropriate destination objects to carry out the transfer (step 1428).

Session object 316 responds by creating an e-mail retrieval PPP object (step 1424), which sets up the PPP connection and retrieves the e-mail. This object is similar to the PPP destination object 318 described in the previous scenarios, but instead retrieves information rather than transmits it. In this sense, the e-mail retrieval PPP object is also similar to source object 312 (receiving information coming to the PFB), with the exception that the PPP destination object 318 initiates the connection, and the link to session object 316 is already established.

Once the e-mail arrives, session object 316 begins handling the e-mail as it would if the e-mail had arrived coming into PFB 110 unsolicited. That is, session object determines the destination of the e-mail, and sets up the necessary destination objects 318 for transfer (step 1428). The e-mail is then transferred (step 1432). Alternatively, the PPP connection may remain open until a period of time has elapsed without the arrival of additional e-mails, or until a predetermined period of time has elapsed.

V. CONCLUSION

The present invention thus provides apparatus and methods for increasing efficiency and convenience of exchanging information in a corporate environment over a multitude of information formats and transfer channels. It will be apparent to those skilled in the art that various modifications and variations can be made in the preferred embodiment of the present invention and in construction of this protocol Fax Box without departing from the scope or spirit of the invention.

Other embodiments of the invention will be apparent to those skilled in the art from consideration of the specification and practice of the disclosed embodiments. The specification and examples are exemplary only, and the true scope and spirit of the invention is defined by the following claims and their equivalents.

We claim:

1. Apparatus for processing information, comprising:

a plurality of interfaces;

means for receiving an incoming information object having a first protocol and first data over one of the interfaces;

means for analyzing the incoming information object based on at least one criteria to determine an outgoing destination different from a destination defined in the incoming information object;

means for processing the incoming information object to create outgoing information having a protocol and data specifically for the outgoing destination; and means for transmitting the outgoing information over at least one of the interfaces to the outgoing destination.

2. The apparatus of claim 1, wherein the means for receiving incoming information comprises:

hardware means for providing an indication of an event in response to receiving the incoming information; and source object means, created in response to the indication, for handling transfer of the incoming information from the hardware means.

3. The apparatus of claim 2, wherein the source object means includes means for creating a session object for managing a session of receiving the incoming information and transferring the outgoing information.

4. The apparatus of claim 1, wherein the means for processing the incoming information includes:

destination object means for processing the incoming information from the first protocol to the second protocol.

5. The apparatus of claim 1, wherein the first protocol includes a fax protocol and the second protocol includes an E-mail protocol.

6. The apparatus of claim 1, wherein the first protocol includes a network protocol and the second protocol includes a telephone protocol.

7. The apparatus of claim 1, further comprising network hub means for connecting to a network device and one of said plurality of interfaces.

8. The apparatus of claim 1, wherein the means for analyzing the incoming information object includes means for determining a need for a point-to-point protocol (PPP) connection; and the means for processing the incoming information object includes means for establishing a PPP connection.

9. The apparatus of claim 8, wherein the means for determining a need for a point-to-point protocol connection includes means for analyzing caller ID information.

10. The apparatus of claim 1, wherein the means for analyzing the incoming information object comprises means for managing a session of receiving the incoming information and transferring the outgoing information to at least one destination.

11. The apparatus of claim 10, wherein the session object means includes means for creating a destination object.

12. The apparatus of claim 10, wherein the session object means includes means for creating multiple destination objects.

13. The apparatus of claim 10, wherein the session object means includes means for logging session information.

14. The apparatus of claim 10, wherein the means for managing a session includes means for managing transmission of information to the outgoing destination.

15. The apparatus of claim 10, wherein the means for managing a session includes means for managing transmission of information to multiple outgoing destinations.

16. A method of processing information in a system having a plurality of interfaces, comprising the steps of:

receiving an incoming information object having a first protocol over at least one of the interfaces;

analyzing the incoming information object based on at least one criteria to determine an outgoing destination different from a destination defined in the incoming information object;

processing the incoming information object to create outgoing information having protocol and data specifically for the outgoing destination; and transmitting the outgoing information over at least one of the interfaces to the determined outgoing destination.

17. The method of claim 16, wherein the step of receiving incoming information includes the substeps of:

providing an indication of an event in response to receiving the incoming information; and creating a source object means in response to the indication, for handling transfer of the incoming information.

18. The method of claim 16, further including a step of creating a session object for managing a session of receiving the incoming information and transferring the outgoing information.

19. The method of claim 16, wherein the processing incoming information includes:

processing the incoming information from the first protocol to the second protocol.

20. The method of claim 16, wherein the first protocol includes a fax protocol and the second protocol includes an E-mail protocol.

21. The method of claim 16, wherein the first protocol includes a network protocol and the second protocol includes a telephone protocol.

22. The method of claim 16, wherein the step of analyzing the incoming information object includes determining a need for a point-to-point protocol connection; and the step of processing the incoming information object includes establishing a point-to-point protocol connection.

23. The apparatus of claim 22, wherein the means for determining a need for a point-to-point protocol connection includes means for analyzing caller ID information.

24. The apparatus of claim 16, further comprising network hub means for connecting to a network device and one of said plurality of interfaces.

25. The method of claim 16, wherein the step of analyzing the incoming information object includes the substep of:

managing a session of receiving the incoming information object and transferring the outgoing information to at least one destination.

26. The method of claim 25, further including the step of:

creating a destination object.

27. The method of claim 25, further including the step of:

creating multiple destination objects, each having unique.

28. The method of claim 25, wherein the step of managing a session includes the substep of:

logging session information.

* * * * *

UNITED STATES PATENT AND TRADEMARK OFFICE
CERTIFICATE OF CORRECTION

PATENT NO.        : 6,278,532 B1                                                                Page 1 of 1
APPLICATION NO. : 08/770775
DATED             : August 21, 2001
INVENTOR(S)       : Larry M. Heimendinger and Richard J. McConnell It is certified that error appears in the above-identified patent and that said Letters Patent is hereby corrected as shown below:

In Claim 1:
At column 18, line 39, "protocol" should be changed to -- second protocol --

In Claim 2:
At column 18, line 44, "incoming information" should be changed to -- the incoming information object --

In Claim 17:
At column 19, line 42, "incoming information" should be changed to -- the incoming information object --

In Claim 19:
At column 20, lines 8-9, "the processing incoming information" should be changed to
-- processing the incoming information object --

At column 20, line 10, "incoming information" should be changed to -- incoming information object --

Signed and Sealed this

Thirteenth Day of July, 2010

David J. Kappos
*Director of the United States Patent and Trademark Office*

UNITED STATES PATENT AND TRADEMARK OFFICE
CERTIFICATE OF CORRECTION

PATENT NO.       : 6,278,532 B1
APPLICATION NO. : 08/770775
DATED            : August 21, 2001
INVENTOR(S)      : Larry M. Heimendinger and Richard J. McConnell It is certified that error appears in the above-identified patent and that said Letters Patent is hereby corrected as shown below:

In Claim 2:
At column 18, line 46, "incoming information" should be changed to -- incoming information object --

At column 18, line 48, "incoming information" should be changed to -- incoming information object --

In Claim 3:
At column 18, line 52, "incoming information" should be changed to -- incoming information object --

In Claim 4:
At column 18, line 55, "incoming information" should be changed to -- incoming information object --

At column 18, lines 56-57, "incoming information" should be changed to -- incoming information object --

In Claim 11:
At column 19, lines 15-16, "session object means" should be changed to -- means for managing a session --

In Claim 12:
At column 19, lines 17-18, "session object means" should be changed to -- means for managing a session --

In Claim 13:
At column 19, lines 20-21, "session object means" should be changed to -- means for managing a session --

In Claim 16:
At column 19, line 37, "protocol" should be changed to -- a second protocol --

Signed and Sealed this

Fourteenth Day of December, 2010

David J. Kappos
*Director of the United States Patent and Trademark Office*

In Claim 17:
At column 19, line 44, "incoming information" should be changed to -- incoming information object --

At column 20, lines 2-3, "incoming information" should be changed to -- incoming information object --

In Claim 18:
At column 20, line 6, "incoming information" should be changed to -- incoming information object --